Oct. 2, 1956  G. V. HAGBY ET AL  2,765,152
EXTENDED SURFACE HEAT EXCHANGER
Filed Nov. 3, 1953  4 Sheets—Sheet 4

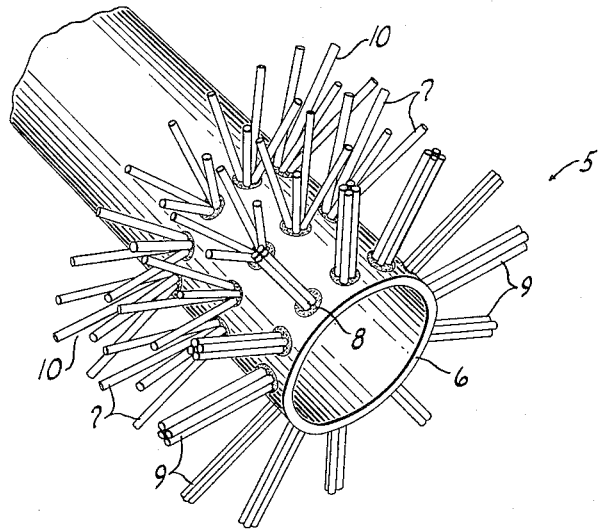
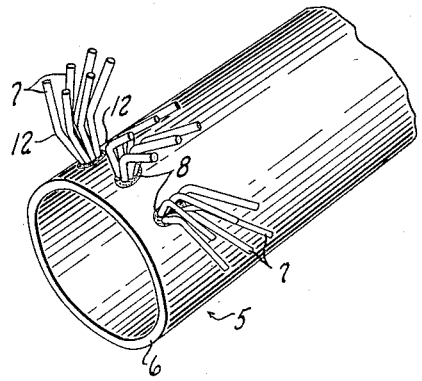
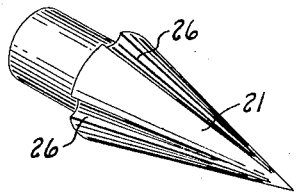

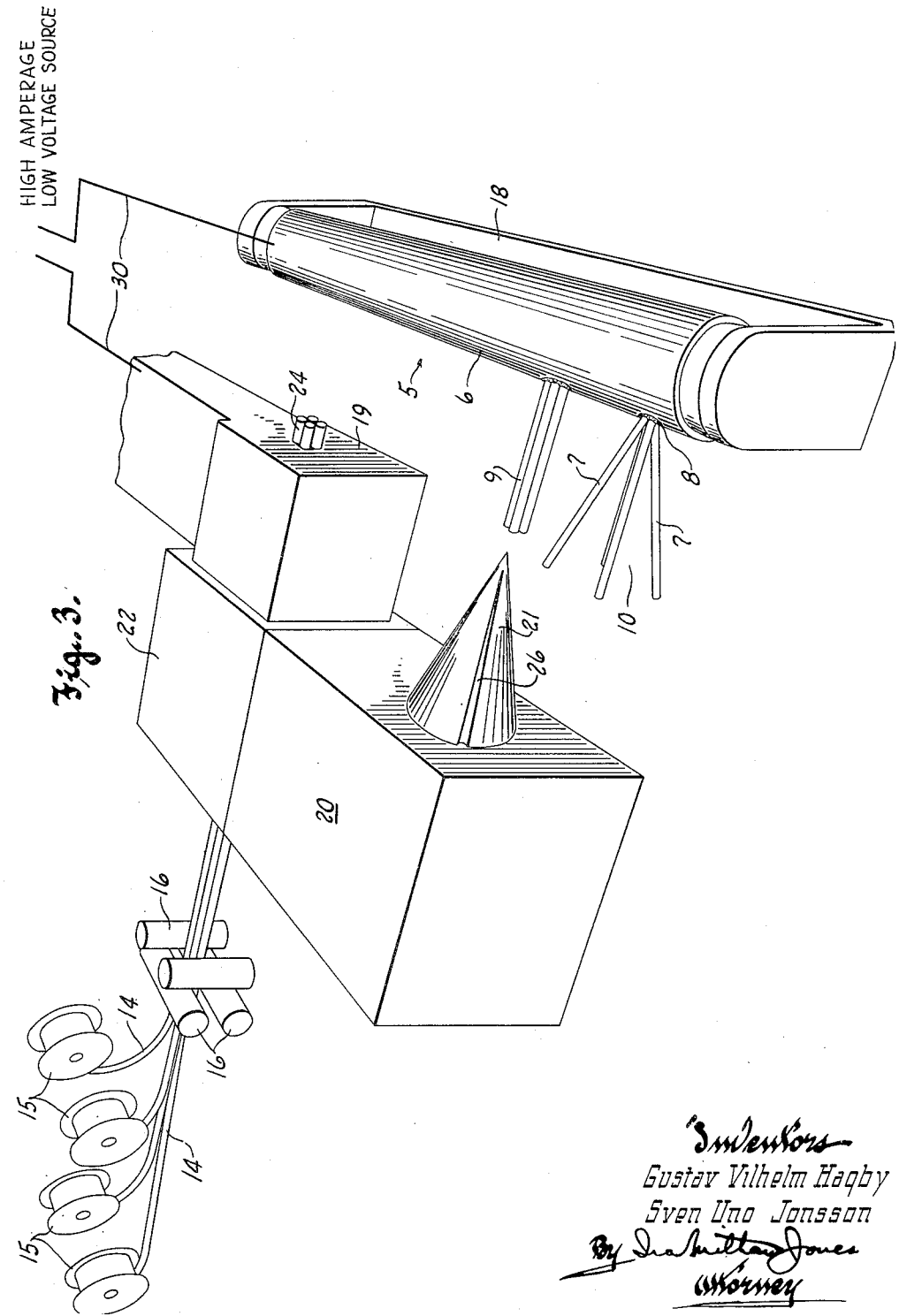

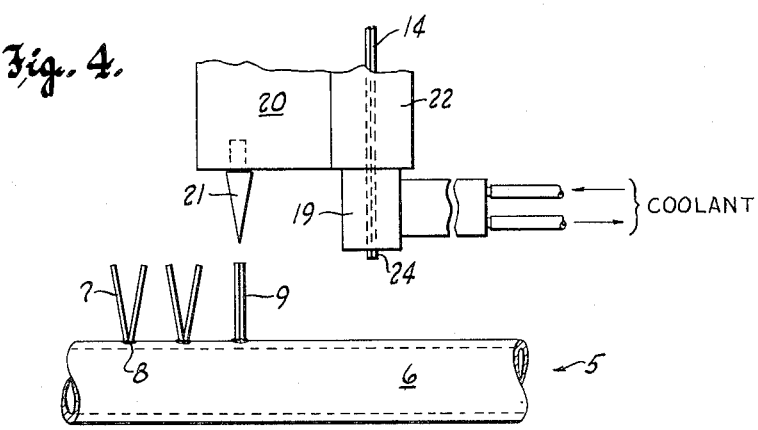
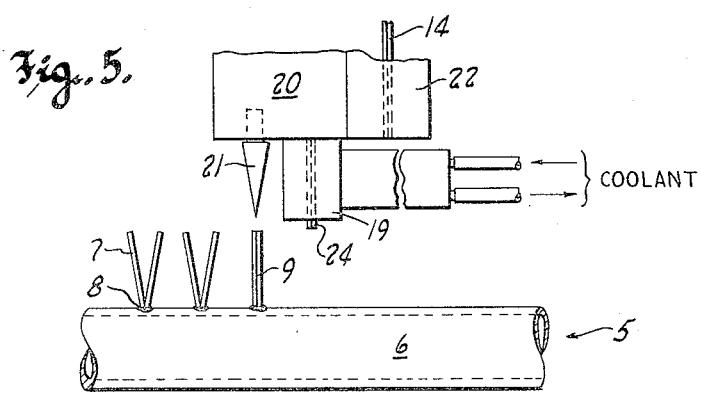
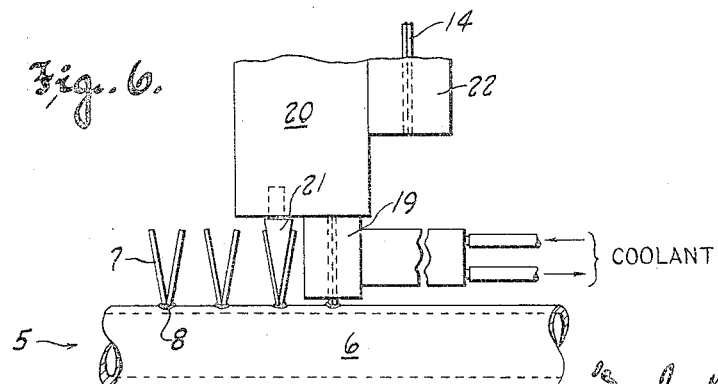

Inventors
Gustav Vilhelm Hagby
Sven Uno Jonsson
By
Attorney

United States Patent Office 2,765,152
Patented Oct. 2, 1956

2,765,152

EXTENDED SURFACE HEAT EXCHANGER

Gustav Vilhelm Hagby and Sven Uno Jonsson, Sodertalje, Sweden, assignors to A/B Svenska Maskinverkin, Sodertalje, Sweden, a corporation of Sweden Application November 3, 1953, Serial No. 389,956

Claims priority, application Sweden November 10, 1952

1 Claim. (Cl. 257—263)

This invention relates to extended surface heat exchangers, and refers more particularly to a heat exchanger comprising a metal base wall having closely spaced wire or rod-like metal elements of high thermal conductivity projecting therefrom, and to a method and apparatus for fabricating the same.

Patent No. 2,584,189, issued February 5, 1952, to David Dalin shows and describes a method of making extended surface heat exchangers of the type here involved by use of an electric welding operation employing resistance welding, in which method rod-like or wire-like metal extended surface elements are bonded to a base wall by means of an electric current of low voltage and high amperage passed through the base wall and the adjacent portion of each element while the element is pressed against the surface of the base wall.

Although the method covered in that patent was commercially feasible and successful, the present invention contemplates an improvement thereof, especially with respect to production costs. The primary object of the present invention, therefore, is to provide an apparatus for materially expediting the production of extended surface heat exchangers of the character described, and thus reducing the cost thereof, by very substantially reducing the number of welding or bonding operations required to produce the same as compared with the number of such operations necessary with methods and apparatus heretofore known.

While it may be obvious that the number of welding or bonding operations required to secure a given number of rod-like elements to a wall surface can be materially reduced by simultaneously securing a plurality of such elements to the wall surface during each operation, the practical application of this principle to the actual mass-production of extended surface heat exchangers presents a difficult problem. Any feasible apparatus intended for the welding of rod-like elements onto heat exchanger wall surfaces must be adapted for use not merely with one type of heat exchanger base wall but with a wide variety of shapes and sizes of wall members. For example, such apparatus must be capable of employment with tubular heat exchangers of many different diameters and preferably also with heat exchangers comprising substantially flat wall surfaces.

It is thus another important object of this invention to provide apparatus for the simultaneous securement of a plurality of rod-like extended surface elements to metal base heat exchanger walls of a wide range of shapes, sizes and contours without necessitating elaborate or intricate adjustment of the apparatus to accommodate it to such varied types of wall elements.

With the above and other objects in view, which will appear as the description proceeds, this invention resides in the novel construction, combination and arrangement of parts in an extended surface heat exchanger, substantially as hereinafter described and more particularly defined by the appended claim, it being understood that such changes in the precise embodiment of the herein-disclosed invention may be made as come within the scope of the claim.

The accompanying drawings illustrate several complete examples of the physical embodiments of the invention practiced and constructed according to the best modes so far devised for the practical application of the principles thereof, and in which:

Figure 1 is a perspective view of a partially finished extended surface heat exchanger embodying the principles of this invention and manufactured according to the method thereof;

Figure 2 is a perspective view showing a portion of a modified form of heat exchanger produced in accordance with the principles of this invention;

Figure 3 is a more or less diagrammatic perspective view of a machine constructed in accordance with the principles of this invention for the application of extended surface elements to a tubular base wall;

Figures 4, 5 and 6 are fragmentary plan views of the machine shown in Figure 3, illustrating successive steps in the method;

Figure 7 is an enlarged perspective view of a part of the machine; and

Figure 8:
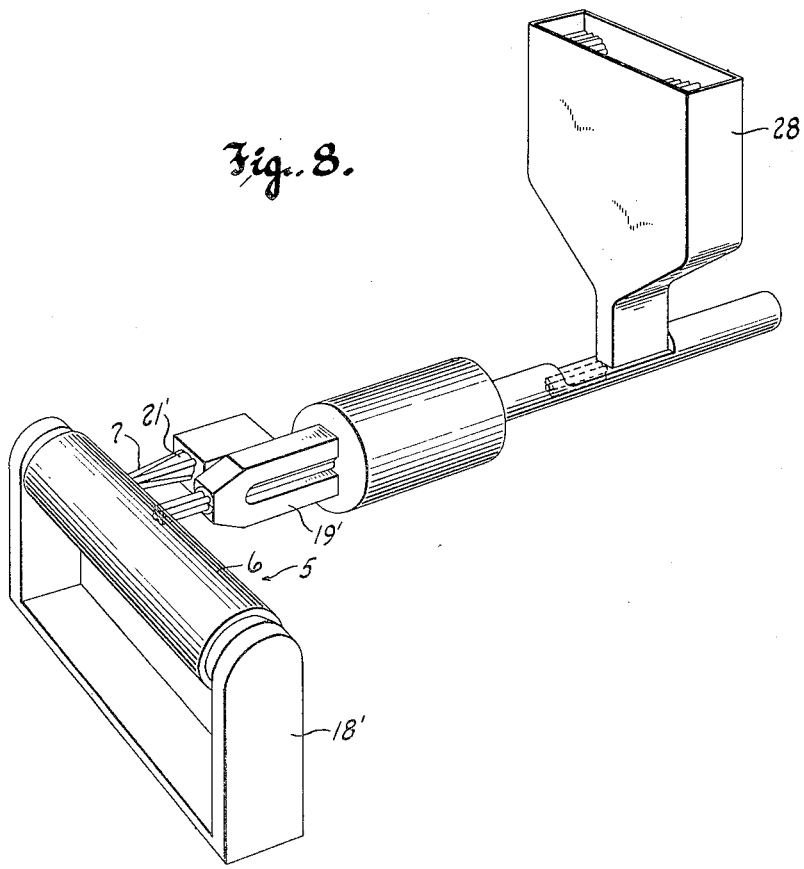
Figure 8 is a more or less diagrammatic perspective view of another type of machine for practicing the method of this invention.

Referring now more particularly to the accompanying drawings, in which like numerals designate like parts throughout the several views, the numeral 5 designates generally a heat exchanger comprising a tubular metal base wall 6 having rod-like extended surface elements 7 bonded thereto and projecting substantially radially therefrom. These extended surface elements are formed from a metal having a high coefficient of thermal conductivity, as for instance copper, and are welded to the base wall, as at 8, by a method which employs the principles generally disclosed in the aforesaid Patent No. 2,584,189, but which is more particularly set forth hereinafter.

Attention is directed to the group-wise disposition of the extended surface elements. As may be seen from both of the embodiments of the heat exchanger of this invention, respectively depicted in Figures 1 and 2, the extended surface elements project from the base wall in spaced-apart groups, each group comprising a plurality of rod-like elements having their radially inner ends bonded to the base wall closely adjacent to one another. As exemplified by the groups 9 of elements in Figure 1, the elements may be initially fastened to the base wall in such a manner that they extend therefrom parallel and closely adjacent to one another, to be subsequently bent or shaped as exemplified by the groups of elements 10, so that the several elements of each group diverge from one another and the free or radially outer ends of all of the rod-like elements of all of the groups are spaced apart substantially uniform distances. When the elements are bent in this manner they are so disposed as to create a desirable turbulent flow in all parts of the fluid stream passing thereover, and at the same time, by reason of their substantially uniform distribution across the fluid stream, they are capable of maximum heat transfer therewith.

As may be seen from a comparison of Figures 1 and 2, the number of individual rod-like elements which may comprise a group thereof may vary, for example four elements being shown as comprising each group in the embodiment of Figure 1, while six elements are in each group in the Figure 2 version. Moreover, it will be seen that the elements may be bent in any suitable manner. Those in Figure 1 are bent closely adjacent to their welded ends, while those in Figure 2 are slightly bent adjacent to their welded ends and are also bent medially as at 12. It will be understood that the elements are bent in the manner just described after they are welded to the base wall, and this is necessary because the elements are held parallel and adjacent to one another during the welding operation and must be substantially separated by bending to afford the necessary uniform distribution of their free end portions in the fluid stream flowing thereover.

While the stated procedure is desirable, the elements of each group could be welded to the base wall while being held at angles to one another, so that they are initially installed with their welded ends or bases close together and their free ends separated as just described, without any necessity for a bending operation.

The feature of securing the rod-like elements to the base wall with their welded ends very closely adjacent to one another is an important aspect of the invention because it enables the present method to be embodied in simple but nonetheless versatile apparatus, capable of installing groups of rod-like elements on a heat exchanger wall of any of a wide variety of shapes and contours without the necessity for making intricate adjustments to the machine to accommodate it to the peculiarities of the base wall surface.

It will be understood that in the actual practice of the method set forth in the aforesaid Patent No. 2,584,189, the rod-like elements are necessarily held in some sort of clamping means. Where several such elements are simultaneously held in such a clamping means, with their ends to be welded spaced from one another, it is virtually impossible to engage all of them against the wall surface under the same degree of endwise pressure unless their base ends are very carefully disposed in a line corresponding accurately to the profile of the surface to which they are to be welded. This difficulty is substantially overcome in the present invention by holding the base ends of the several elements closely adjacent to one another during the welding operation, so that together they engage only a relatively small area of the wall surface, in which the contour variation of the surface is relatively small.

Thus the method of this invention, as may be seen from what has been said so far, comprises the simultaneous securement of a plurality of extended surface elements to a base wall by resistance welding (employing the basic principle set forth in the aforesaid Patent No. 2,584,189), with the elements of the group so held during the welding operation that their welded ends are closely adjacent to one another; and subsequently bending the individual elements of the group so as to diverge them from one another and more uniformly disperse the body portions of the elements of the several groups bonded to the heat exchanger wall.

The apparatus shown more or less diagrammatically in Figure 3 is an embodiment of one type of device by means of which the method of this invention may be practiced. In this device the extended surface elements comprising each group thereof are cut from continuous lengths of rod or wire stock and are automatically bonded to a base wall, and the several elements of each group are automatically divergingly bent as the next group is bonded into place on the base wall. The specific apparatus shown in Figure 3 and described hereinafter is adapted to operate upon four extended surface elements at a time, but it will be understood that the principles of the apparatus are equally applicable to a machine for the installation of groups consisting of more or less than that number of elements.

The several continuous lengths of wire stock 14 from which the rod-like extended surface elements are formed may be carried on individual supply reels 15 suitably mounted for free rotation, and the lengths of wire stock being fed from the reels are intermittently advanced into the working mechanism of the apparatus, as by means of power driven feed rollers 16, the operation of which is synchronized with that of the working mechanism now to be described.

The mechanism of the apparatus comprises, in general, a carriage or holder 18 for holding the heat exchanger base wall to which groups of extended surface elements are to be applied, a chuck or clamping means 19 in which the rod-like elements are held and by which they are urged into forceful endwise engagement with a base wall in the holder during the welding operation, a ram 20 which reciprocates the chuck toward and from the carriage 18, and a tapered mandrel 21 on the ram by means of which an installed group of rod-like elements is divergingly bent simultaneously with the welding of the next group of elements to the base wall.

The specific steps in the operation of the apparatus are best understood by reference to Figures 4, 5 and 6. Initially, wire or rod material from the four reels 15 thereof is advanced by means of the rollers 16 through a guide 22 and thence into the chuck 19. The several wires are all advanced at the same rate and are held parallel to one another in the chuck with their ends remote from the reels projecting from the chuck a short distance, as at 24, toward the holder 18. It will be understood that the chuck has a flat rear face which is in intimate flatwise engagement with a corresponding front face on the guide means, and consequently lateral motion of the chuck from the position shown in Figure 4 to that shown in Figure 5 shears off the end portions of the four wires clamped in the chuck, leaving four rod-like elements of uniform length in the chuck. Motion of the chuck to the position in which it is shown in Figure 5 carries it into driving engagement with the ram 20 upon which the tapered mandrel is mounted. In the next operation, as indicated in Figure 6, the ram advances the chuck and mandrel toward the holder, and the four rod-like elements clamped in the chuck are thereby moved axially into forceful engagement of their projecting ends with the base wall clamped in the holder.

The chuck is preferably conductive and suitable conductors 30 from a source of welding current are connected wtih the chuck and the metal base wall. Hence, when contact is established between the four rod-like elements and the base wall, a circuit is completed through the elements and the base wall by which resistance welding of the rod-like elements to the base wall is effected. It will be understood that the ram applies sufficient force to the chuck to place the rod-like elements therein under the degree of axial pressure required to effect a good bond with the base wall, as explained in detail in the aforesaid Patent No. 2,584,189.

In order to prevent adhesion of the rod-like elements to the chuck as a result of the heating of the elements during the welding operation, the chuck is preferably cooled by fluid circulated therethrough in a manner which will be obvious to those skilled in the art.

When a satisfactory weld has been established between the four rod-like elements and the base wall, the clamping engagement between the chuck and the metal elements is released and the chuck is returned to the position shown in Figure 4 to have more wire stock fed into it for the next welding operation. Because the feed rollers advance all of the wires into the chuck at a uniform rate, and the wires are all sheared off at the same point, the rod-like elements will always be of uniform length.

It will be understood that the chuck has internal means for securely clamping the end portions of the wires received therein at the beginning of its operating cycle and for releasing the same immediately after the weld is completed, the details of these clamping means, which will be obvious to those skilled in the art, being omitted from the drawings for the sake of simplicity.

After the welding operation is completed, and preferably during the interval when the chuck is being reloaded, the ram and the base wall of the heat exchanger are moved laterally with respect to one another, preferably by moving the carriage upon which the wall is mounted through a distance equal to the center-to-center distance between the mandrel and the chuck when the latter is in its operative position of engagement with the ram illustrated in Figures 5 and 6. As a result of such movement of the carriage, each successive group of elements bonded to the wall is spaced a uniform distance along the length of the heat exchanger from the previously applied group.

Moreover, as a result of such movement of the wall member, the ram, in advancing toward the carriage, causes the tapered mandrel to engage the group of elements which has just been welded to the wall member and to bend them to diverge from one another as described above. To facilitate such bending of the elements, the mandrel is preferably in the form of a sharply tapered cone, as best seen in Figure 7, provided with longitudinal flutes or grooves 26 which guide the several elements as the mandrel is bending them, and there is, of course, one groove in the mandrel for each element in the group installed by the apparatus.

It will be understood that the mandrel may be omitted from the apparatus and that certain of the elements of each group may be bent intermediate their ends by rotating the base wall while the elements to be bent are caused to engage a fixed bar intermediate their ends.

In the apparatus for practicing the method of this invention shown more or less diagrammatically in Figure 8, precut rod-like elements contained in a hopper 28 are intermittently advanced in groups into the chuck 19' in timed relationship with the reciprocation of the chuck toward and from the holder 18'. Because the elements are precut, lateral motion of the chuck to effect cutting, as in the Figures 3–7 apparatus, is not necessary and the chuck and tapered mandrel 21' are constrained to reciprocating motion in unison.

From the foregoing description taken in connection with the accompanying drawings, it will be readily apparent that this invention provides an extended surface heat exchanger which may be produced by a very expeditious and inexpensive method wherein rod-like elements are groupwise welded to a metal base wall with the welded ends of the several elements forming each group closely adjacent to each other, so as to cover only a relatively small area of the base wall surface; and it will be seen that the method of this invention may be practiced by means of very simple and inexpensive apparatus.

What we claim as our invention is:

A metal base wall for a heat exchanger or the like having elongated rod-like extended surface elements thereon of high thermal conductivity, characterized by the fact that the rod-like elements have a uniform cross section throughout their length and are arranged in spaced apart groups each containing a number of rod-like elements tightly bunched together at one end of the group and diverging from their bunched ends to have their opposite ends spaced substantially uniform distances apart, the bunched ends of said rod-like elements in each group thereof endwise abutting the base wall and being resistance welded thereto and to one another by a common joint of high thermal conductivity, and the area of said common joint being greater than the combined cross sectional areas of the rod-like elements in the group.

References Cited in the file of this patent

UNITED STATES PATENTS

| | | |
|---|---|---|
| 607,033 | Gresty | July 12, 1898 |
| 754,195 | Bullard | Mar. 8, 1904 |
| 789,530 | Penn et al. | May 9, 1905 |
| 827,732 | Knox | Aug. 7, 1906 |
| 851,977 | Bigsby et al. | Apr. 30, 1907 |
| 1,546,450 | Meaker | July 21, 1925 |
| 1,922,424 | Evans | Aug. 15, 1933 |
| 1,929,444 | Murry et al. | Oct. 10, 1933 |
| 1,968,079 | Hoffer | July 31, 1934 |
| 1,977,846 | Febrey | Oct. 23, 1934 |
| 2,337,294 | Cooper | Dec. 21, 1943 |
| 2,566,318 | Dalin et al. | Sept. 4, 1951 |

FOREIGN PATENTS

| | | |
|---|---|---|
| 3,750 | Great Britain | Feb. 15, 1904 |